United States Patent
Lin

(10) Patent No.: US 8,331,258 B2
(45) Date of Patent: Dec. 11, 2012

(54) METHOD AND DEVICE FOR RESPONDING TO TERMINATION SERVICE STATE CHANGE INDICATION

(75) Inventor: Yangbo Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 320 days.

(21) Appl. No.: 12/794,258

(22) Filed: Jun. 4, 2010

(65) Prior Publication Data

US 2010/0272116 A1    Oct. 28, 2010

Related U.S. Application Data

(63) Continuation of application No. PCT/CN2008/073152, filed on Nov. 21, 2008.

(30) Foreign Application Priority Data

Dec. 5, 2007   (CN) .......................... 2007 1 0032131

(51) Int. Cl.
*H04L 12/26* (2006.01)
*H04L 12/56* (2006.01)

(52) U.S. Cl. ....................... 370/252; 370/401
(58) Field of Classification Search ............ None
See application file for complete search history.

(56) References Cited

U.S. PATENT DOCUMENTS

| | | | |
|---|---|---|---|
| 7,194,071 B2 * | 3/2007 | Rupsis ...................... | 379/88.16 |
| 2005/0038992 A1 * | 2/2005 | Pelaez ......................... | 713/160 |
| 2006/0045102 A1 * | 3/2006 | Pelaez et al. ................ | 370/401 |
| 2007/0127450 A1 * | 6/2007 | Lin ............................. | 370/356 |
| 2008/0165947 A1 * | 7/2008 | Wang et al. .................. | 379/229 |
| 2008/0267202 A1 * | 10/2008 | Lin ............................. | 370/401 |

FOREIGN PATENT DOCUMENTS

| | | |
|---|---|---|
| CN | 1917506 A | 2/2007 |
| CN | 1941993 A | 4/2007 |

(Continued)

OTHER PUBLICATIONS

International Search Report from P.R. China in International Application No. PCT/CN2008/073152 mailed Mar. 5, 2009.

(Continued)

*Primary Examiner* — Min Jung
(74) *Attorney, Agent, or Firm* — Conley Rose, P.C.; Grant Rodolph

(57) ABSTRACT

A method for responding to termination service state change indication is provided. The method includes: receiving a command message indicating a termination service state change, in which the command message at least includes a method parameter and a duration parameter, the method parameter indicates a change method of the service state, and the duration parameter indicates a maintaining duration of the service state after being changed; and changing the service state of the termination according to method parameter content information of the received command message, and maintaining the changed service state according to duration parameter content information of the received command message. Accordingly, a media gateway controller (MGC) and a media gateway (MG) of the termination service state change indication based on the media gateway control protocols are also provided. The termination service state change and the maintaining duration of the service state after being changed are indicated simultaneously, which is rather convenient for the MG or MGC to realize effective subsequent control on the termination after the service state change of the termination.

17 Claims, 2 Drawing Sheets

FOREIGN PATENT DOCUMENTS

CN  1964365 A  5/2007

OTHER PUBLICATIONS

Written Opinion of the International Searching Authority (translation) dated (mailed) Mar. 5, 2009, issued in related Application No. PCT/CN2008/073152, filed Nov. 21, 2008, Huawei Technologies Co., Ltd.

First Chinese Office Action dated (mailed) Apr. 21, 2011, issued in related Chinese Application No. 200710032131.8 Huawei Technologies C., LTD (10 pages).

ITU-T Telecommunication Standardization Sector of ITU, Series H: Audiovisual and Multimedia Systems, Infrustructure of audiovisual services—Communication procedures, Gateway control protocol: Version 3, H.248.1, Sep. 2005, (191 pages).

* cited by examiner

METHOD AND DEVICE FOR RESPONDING TO TERMINATION SERVICE STATE CHANGE INDICATION

CROSS-REFERENCE TO RELATED APPLICATION

This application is a continuation of International Application No. PCT/CN2008/073152, filed on 21 Nov. 2008, which claims priority to Chinese Patent Application No. 200710032131.8, filed on 5 Dec. 2007, both of which are hereby incorporated by reference in their entireties.

FIELD OF THE TECHNOLOGY

The present invention relates to the field of communications, and more particularly to a method and a device for responding to termination service state change indication based on the media gateway control protocols.

BACKGROUND OF THE INVENTION

The media gateway controller (MGC) and the media gateway (MG) are two key components of a packet-based network under the service and bearer separation architecture. The MGC is mainly in charge of service control functions, and the MG is mainly in charge of media bearer functions. The gateway separation architecture formed by the MGC and the MG realizes the separation of the service control plane and the media bearer plane, so that the network resources can be fully shared, the device up-gradation and service expansion are simplified, and the development and maintenance cost is reduced.

The MG and the MGC communicate with each other by using media gateway control protocols. The currently prevalent media gateway control protocols include H.248/Gateway Control Protocol (MeGaCo) and Media Gateway Control Protocol (MGCP). The MGCP is developed and amended by the Internet Engineering Task Force (IETF). The H.248/MeGaCo protocol is developed based on the MGCP. H.248/MeGaCo version 1 was enacted by the IETF and the International Telecommunications Union (ITU) together in November, 2000 and was amended in June, 2003. H.248 version 2 was enacted by the ITU in May, 2002 and was amended in March, 2004. H.248 version 3 was enacted by the ITU in September, 2005.

Currently, the connection model defined by the H.248/MeGaCo protocol includes terminations and contexts. The termination is a logical entity in the MG (the MG may also be represented by a termination known as Root termination) and capable of sending and receiving one or more types of media. The terminations are categorized into physical terminations and ephemeral terminations. The physical terminations represent some physical entities having semi-permanent existence, such as time division multiplex (TDM) timeslot or analog line, and the ephemeral terminations represent some public resources that are applied for temporarily and are released after use, such as Real-time Transport Protocol (RTP) streams. The attributes of the termination are expressed by Property, Signal, Event, and Statistic, and the attribute parameters of the termination are combined with packages. Moreover, the context represents the association between the terminations. One context may include multiple terminations, and describes the relation between the terminations with topologies. The termination that has not been associated with other terminations is contained in a specific context known as Null context. The context is established when the first termination is added, and is released when the last termination is released.

Based on the above abstract connection model, the interaction between the services and the bearers is actually an operation on the terminations and the contexts. Such operations are implemented through command requests and replies between the MGC and the MG. The types of the command include Add, Modify, Subtract, Move, AuditValue, AuditCapabilities, Notify, and ServiceChange.

The Add command is configured to add a termination into a context. The Add command for the first termination in a context is also configured to establish the context.

The Modify command is configured to modify the attributes of the termination such as Property, Event, Signal, and Statistic.

The Subtract command is configured to delete a termination from a context. The Subtract command for the last termination in a context is also configured to delete the context.

The Move command is configured to move a termination to another context.

The AuditValue command is configured to request for returning the current states of the Property, Event, Signal, and Statistic of a termination on the MG.

The AuditCapabilities command is configured to request for returning all the possible states of the Property, Event, Signal, and Statistic of a termination supported by the MG.

The Notify command permits the MG to notify the MGC of events that occur in the MG.

The ServiceChange command is configured to notify the MGC by the MG that one termination or one group of terminations (may also be the MG itself) will be out of service (including logout) or in service (including login). The ServiceChange command may also be configured to notify the MG by the MGC to enable one termination or one group of terminations (may also be the MG itself) to be out of service or in service. The ServiceChange command may also be configured to perform fault notification and control handoff.

According to the definition of the ServiceState property of the termination state in H.248/MeGaCo, the termination may be in one of the following three service states: InService, OutOfService, and Test. The InService state denotes that the termination may be used or is being used for normal communication, the OutOfService state denotes that the termination cannot be used for communication, and the Test state denotes that the termination is being tested. The service state change of the termination is generally realized through the ServiceChange command.

The ServiceChange command includes a series of parameters, such as Method, Reason, and Delay. The Method parameter may be set to be Graceful, Forced, Restart, Disconnected, Handoff, or Failover. Graceful indicates that the entire MG or a termination thereof will be out of service after a designated delay; Forced indicates that the entire MG or a termination thereof gets out of service abruptly; Restart indicates that the entire MG or a termination thereof restore the service after a designated delay; Disconnected indicates that the MG loses the communication with an MGC but restores the communication with the same MGC subsequently; Handoff indicates that an MGC hands over the control on an MG to another MGC; and Failover indicates that a backup MG takes over when the primary MG fails, or the MG detects that the primary MGC fails and resorts to the control of a backup MGC. The Reason parameter provides further description for the Method, the Delay parameter provides a designated delay for the Method, and the other parameters will not be described in detail herein.

It can be seen from the above that, the MG or MGC may adopt the Restart method of the ServiceChange command to change the service state of the entire MG or a termination on the MG or a group of terminations on the MG to the InService state (for example, to switch a finite state machine of the termination state into the InService state indicated by the Restart method parameter, or set a flag representing the termination service state to the InService state indicated by the Restart method parameter), or the MG or MGC may adopt the Graceful or Forced method of the ServiceChange command to change the service state of the entire MG or a termination on the MG or a group of terminations on the MG into the OutOfService state (for example, to switch a finite state machine of the termination state to the OutOfService state indicated by the Graceful or Forced method parameter, or set a flag representing the termination service state to the OutOfService state indicated by the Graceful or Forced method parameter). Furthermore, the MG may adopt the Disconnected method of the ServiceChange command, and the MGC and the MG may adopt the Handoff method of the ServiceChange command interactively to change the service state of the MG into the InService state.

The Delay parameter may be used in combination with the Restart or Graceful method to realize that the entire MG or a termination on the MG or a group of terminations on the MG to be in service or out of service after a designated delay, that is, this combination indicates that the entire MG or a termination on the MG or a group of terminations on the MG will be changed into a service state and the time required for changing to the service state.

In the reference art, the Delay parameter can only indicate the time required for changing the termination to a service state, while cannot indicate the maintaining duration of the termination in the service state after the state change, so that it is difficult for the MG or MGC to realize effective subsequent control on the termination after the service state change of the termination.

SUMMARY OF THE INVENTION

In order to solve the above technical problems, the embodiments of the present disclosure are directed to a method and a device for responding to termination service state change indication based on the media gateway control protocols, which is convenient for the MG or MGC to realize effective subsequent control on the termination after the service state change of the termination.

Accordingly, in an embodiment, the present invention provides a method for responding to termination service state change indication, which includes the following steps.

A command message indicating a termination service state change is received. The command message at least includes a method parameter and a duration parameter, the method parameter indicates a change method of the service state, and the duration parameter indicates a maintaining duration of the service state after the service state change.

The service state of the termination is changed according to the method parameter of the received command message, and the changed service state is maintained according to the duration parameter of the received command message.

Accordingly, in an embodiment, the present invention provides an MGC, which includes a determining unit and a sending unit.

The determining unit is configured to determine a command message indicating a termination service state change. The command message at least includes a method parameter and a duration parameter, the method parameter indicates a change method of the service state, and the duration parameter indicates a maintaining duration of the service state after the service state change.

The sending unit is configured to send the determined command message to an MG.

Accordingly, in an embodiment, the present invention provides an MG, which includes a determining unit and a sending unit.

The determining unit is configured to determine a command message indicating a termination service state change. The command message at least includes a method parameter and a duration parameter, the method parameter indicates a change method of the service state, and the duration parameter indicates a maintaining duration of the service state after the service state change.

The sending unit is configured to send the determined command message to an MGC.

Accordingly, in an embodiment, the present invention provides an MGC, which includes a receiving unit and a processing unit.

The receiving unit is configured to receive a command message indicating a termination service state change. The command message at least includes a method parameter and a duration parameter, the method parameter indicates a change method of the service state, and the duration parameter indicates a maintaining duration of the service state after the service state change.

The processing unit is configured to change the service state of the termination according to the method parameter of the received command message, and maintain the changed service state according to the duration parameter of the received command message.

Accordingly, in an embodiment, the present invention provides an MG, which includes a receiving unit and a processing unit.

The receiving unit is configured to receive a command message indicating a termination service state change. The command message at least includes a method parameter and a duration parameter, the method parameter indicates a change method of the service state, and the duration parameter indicates a maintaining duration of the service state after the service state change.

The processing unit is configured to change the service state of the termination according to the method parameter of the received command message, and maintain the changed service state according to the duration parameter of the received command message.

In the embodiments of the present invention, the parameters of the command message indicating the termination service state change in the MGCP are introduced, so that the MG or MGC may acquire the termination service state change indication information and the maintaining duration indication information of the service state after the service state change simultaneously, which is rather convenient for the MG or MGC to realize effective subsequent control on the termination after the service state change of the termination.

DETAILED DESCRIPTION OF THE EMBODIMENTS

To make the technical solution, objectives and merits of the present invention clearer, the following describes the embodiments of the present invention in detail with reference to accompanying drawings.

Figure 1:
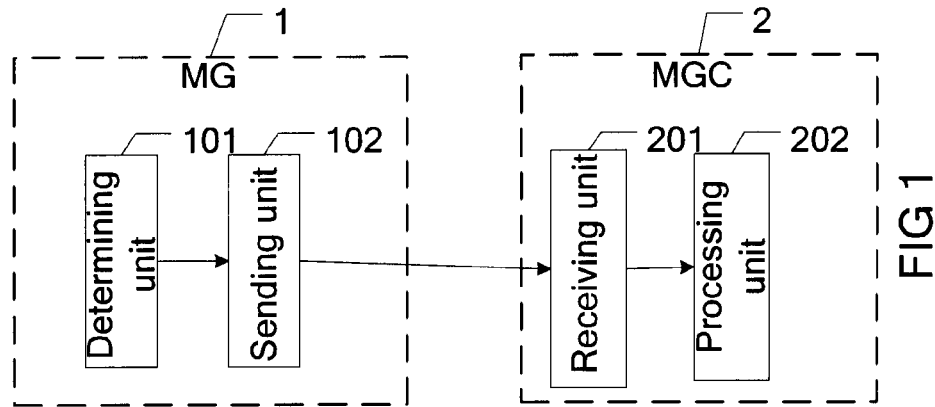
FIG. 1 is a schematic structural view of an embodiment of a system for realizing termination service state change indication according to the present invention.

FIG. 1 is a schematic structural view of an embodiment of a system for realizing termination service state change indication (in which the termination is a logical entity in an MG, and the MG may also be represented by a termination known as Root termination) according to the present invention. As shown in FIG. 1, the system of this embodiment includes an MG 1 and an MGC 2. The MG 1 is configured to determine a command message indicating a termination service state change (for example, the command message may be a ServiceChange command message based on the H.248/MeGaCo protocol or a RestartInProgress command message based on the MGCP), and send the determined command message to the MGC 2. Accordingly, the MGC 2 is configured to receive the command message indicating the termination service state change sent by the MG 1, and change the service state of the termination and maintain the changed service state according to parameter content information of the received command message. The command message indicating the termination service state change at least includes a method parameter and a duration parameter. In specific implementation, the service states of the termination include at least two service states, for example, in the H.248/MeGaCo protocol, the service states of the termination include three service states, namely, InService, OutOfService, and Test. In this embodiment, a unified duration parameter is configured to indicate the maintaining duration of each service state of the termination. In particular, the method parameter indicates a change method of the service state, and the duration parameter indicates a maintaining duration of the service state after the service state change.

An example is given below to illustrate the present invention, in which the command message is a ServiceChange command message.

Referring to FIG. 1 again, the MG 1 further includes a determining unit 101 and a sending unit 102.

The determining unit 101 is configured to determine a ServiceChange command message. The ServiceChange command message at least includes a Method parameter and a Duration parameter. The method parameter indicates a change method of the service state, and the duration parameter indicates a maintaining duration of the service state after the service state change. The duration parameter and the method parameter can be used in combination. For example, when the ServiceChange command includes the Method parameter and the Duration parameter at the same time, it indicates the duration of the termination expectedly maintaining at a service state that the termination is eventually changed into after the Method is applied to the termination. In specific implementation, the ServiceChange command message may include a series of parameters, such as Method, Reason, Delay, and Duration. The Method parameter may further be set to be Graceful, Forced, Restart, Disconnected, Handoff, or Failover.

Furthermore, the Duration parameter may be set to be an absolute time or a relative time, and if being set to be the absolute time, the Duration parameter is composed of date and time. For example, "20080808T080808Z" indicates that the termination will maintain the service state till 08:08:08, Aug. 8, 2008. If the Duration parameter is set to be the relative time, a starting point of the relative time is the absolute time for changing to the service state, that is, the relative time starts at the time when the termination is formally changed to the service state. If the ServiceChange command message includes the Delay parameter at the same time, the relative time shall start after the delay time denoted by the Delay parameter, and the unit of the relative time is second, for example, when the relative time is set to be "99999", it indicates that the termination will maintain the service state for 99999 seconds since the termination is formally changed to the service state. For example, the ServiceChange {Method=Restart, Duration=1000} indicates that the termination will be immediately changed to the InService state, and maintain the service state for 1000 seconds after the service state change; and the ServiceChange {Method=Graceful, Delay=30, Duration=3000} indicates that the termination will be changed to the OutOfService state in 30 seconds, and maintain the service state for 3000 seconds after the service state change.

In addition, the Duration parameter merely indicates the maintaining duration of a service state, and does not indicate that the service state will change automatically when the duration is ended, and only the method parameter in the ServiceChange command can change the service state of the termination. Therefore, the parameter does not affect the execution of other parameter in the ServiceChange command.

The sending unit 102 is configured to send the determined ServiceChange command message to the receiving device 20.

Accordingly, referring to FIG. 1 again, the MGC 2 further includes a receiving unit 201 and a processing unit 202.

The receiving unit 201 is configured to receive a ServiceChange command message sent by the MG 1.

The processing unit 202 is configured to change the service state of the termination and maintain the changed service state according to parameter content information in the received ServiceChange command message. For example, when the MG 1 sends a ServiceChange {Method=Restart, Duration=1000} command message, the processing unit 202 immediately changes the service state of the termination designated by the message to the InService state according to the ServiceChange command message, and maintains the termination at the service state for 1000 seconds after the service state change of the termination; and when the MG 1 sends a ServiceChange {Method=Graceful, Delay=30, Duration=3000} command message, the processing unit 202 changes the service state of the termination designated by the message to the OutOfService state in 30 seconds according to the ServiceChange command message, and maintains the service state of the termination for 3000 seconds after the service state change.

In this embodiment, by using the ServiceChange command message with the extended duration parameter, the MG sends the termination service state change indication information to the MGC, and sends the maintaining duration indication information of the service state to which the termination changes to the MGC simultaneously, which is rather convenient for the MG or MGC to realize effective subsequent control on the termination after the service state change. For example, when the MG is overloaded or under planned maintenance, the MG notifies the MGC that it has been or will be soon out of service, and meanwhile if information about the time when the MG restores the service is attached, it facilitates the subsequent control of the MGC, including call inhibition or redirection or notifying a subscriber to wait for a time before trying to call again. Definitely, in specific implementation, by using the ServiceChange command message of the extended duration parameter, the MGC may also send the termination service state change indication information to the MG, and send the maintaining duration indication information of the service state to which the termination changes to the MG simultaneously, such that the MG changes the service state of the termination and maintains the changed service state according to the parameter content information of the received command message.

Furthermore, in specific implementation, different duration parameter may be adopted for different termination service states, for example, the parameter indicating the maintaining duration of the InService state is named as InDuration. The InDuration parameter can merely be used in combination with the Restart method, and indicates the duration of a termination maintaining at the InService state after the termination is changed to the state. The parameter indicating the maintaining duration of the OutOfService state is named as OutDuration. The OutDuration parameter can merely be used in combination with the Graceful or Forced method, and indicates the duration of a termination maintaining at the OutOfService state after the termination is changed to the state.

Figure 2:
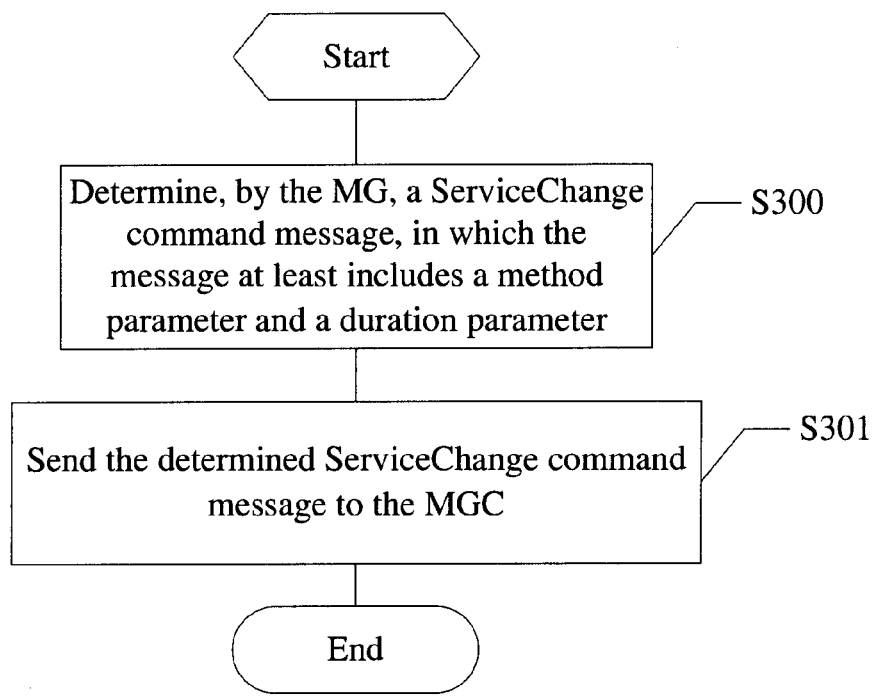
FIG. 2 is a schematic flow chart of an embodiment of a method for sending a termination service state change indication according to the present invention.

Accordingly, FIG. 2 is a schematic flow chart of an embodiment of a method for sending a termination service state change indication according to the present invention. As shown in FIG. 2, the method includes the following steps.

In Step S300, an MG determines a ServiceChange command message. The message at least includes a method parameter and a duration parameter. The method parameter indicates a change method of the service state, and the duration parameter indicates a maintaining duration of the service state after the service state change. The duration parameter and the method parameter can be used in combination. For example, when the ServiceChange command includes the Method parameter and the Duration parameter at the same time, it indicates the duration of the termination expectedly maintaining at a service state that the termination is eventually changed into after the Method is applied to the termination. In specific implementation, the ServiceChange command message may include a series of parameters, such as Method, Reason, Delay, and Duration. The Method parameter may further be set to be Graceful, Forced, Restart, Disconnected, Handoff, or Failover.

Furthermore, the Duration parameter may be set to be an absolute time or a relative time, and if being set to be the absolute time, the Duration parameter is composed of date and time. For example, "20080808T080808Z" indicates that the termination will maintain the service state till 08:08:08, Aug. 8, 2008. If the Duration parameter is set to be the relative time, a starting point of the relative time is the absolute time for changing to the service state, that is, the relative time starts at the time when the termination is formally changed to the service state. If the ServiceChange command message includes the Delay parameter at the same time, the relative time shall start after the delay time denoted by the Delay parameter, and the unit of the relative time is second, for example, when the relative time is set to be "99999", it indicates that the termination will maintain the service state for 99999 seconds since the termination is formally changed to the service state. For example, the ServiceChange {Method=Restart, Duration=1000} indicates that the termination will be immediately changed to the InService state, and maintain the service state for 1000 seconds after the service state change; and the ServiceChange {Method=Graceful, Delay=30, Duration=3000} indicates that the termination will be changed to the OutOfService state in 30 seconds, and maintain the service state for 3000 seconds after the service state change.

In addition, the Duration parameter merely indicates the maintaining duration of a service state, and does not indicate that the service state will change automatically when the duration is ended, and only the method parameter in the ServiceChange command can change the service state of the termination. Therefore, the parameter does not affect the execution of other parameter in the ServiceChange command.

In Step S301, the determined ServiceChange command message is sent to the MGC.

Figure 3:
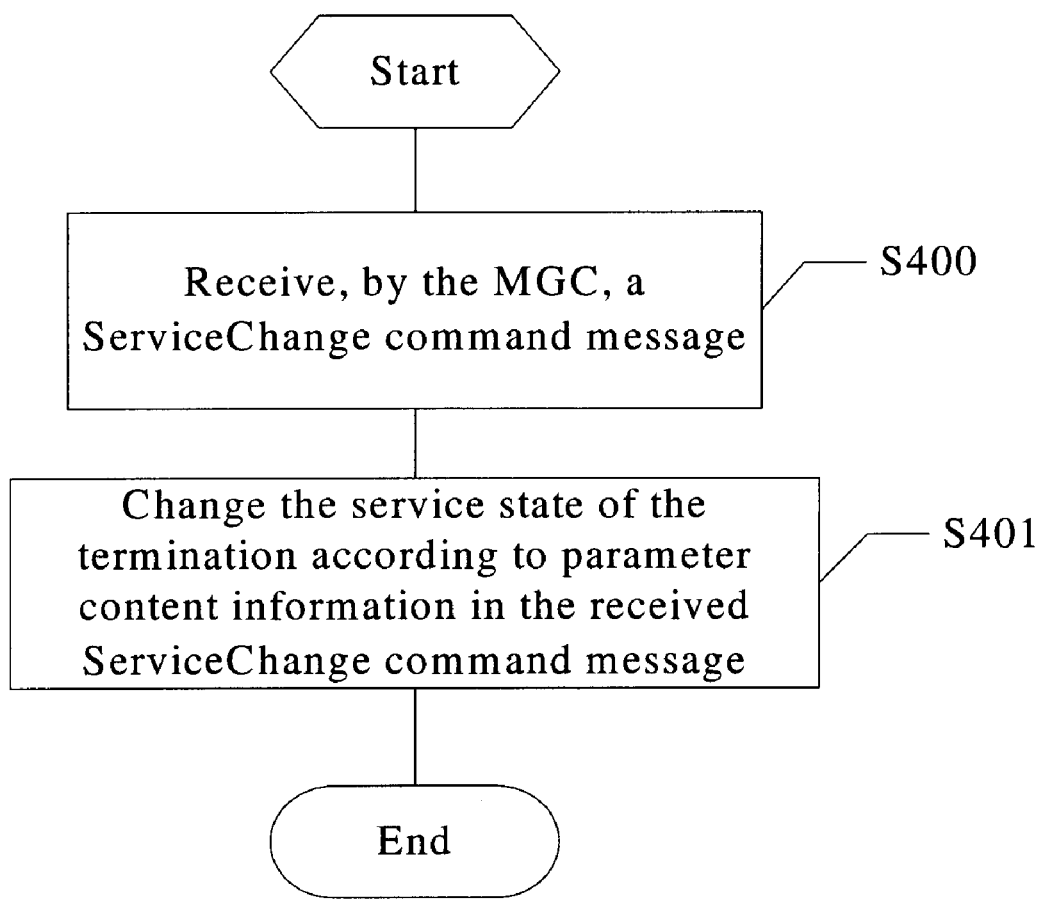
FIG. 3 is a schematic flow chart of an embodiment of a method for responding to termination service state change indication according to the present invention.

FIG. 3 is a schematic flow chart of an embodiment of a method for responding to termination service state change indication according to the present invention. As shown in FIG. 3, the method includes the following steps.

In Step S401, an MGC receives a ServiceChange command message.

In Step S402, the service state of the termination is changed and the changed service state is maintained according to parameter content information in the received ServiceChange command message. For example, when an MG sends a ServiceChange {Method=Restart, Duration=1000} command message, the MGC immediately changes the service state of the termination designated by the message to an InService state according to the ServiceChange command message, and maintains the termination at the service state for 1000 seconds after the service state change of the termination; and when the MG sends a ServiceChange {Method=Graceful, Delay=30, Duration=3000} command message, the MGC changes the service state of the termination designated by the message to an OutOfService state in 30 seconds according to the ServiceChange command message, and maintain the service state of the termination for 3000 seconds after the service state change.

Accordingly, another embodiment of the sending side performing the termination service state change indication method based on the media gateway control protocols specifically includes the following steps. An MGC determines a ServiceChange command message. The message at least includes a method parameter and a duration parameter. The MGC sends the determined ServiceChange command message to an MG. Another embodiment of the receiving side performing the method specifically includes the following steps. An MG receives a ServiceChange command message, changes the service state of the termination according to parameter content information in the received ServiceChange command message, and maintains the changed service state according to a duration parameter.

In the embodiments of the present invention, the ServiceChange command message based on the H.248/MeGaCo protocol is adopted as the command message indicating the termination service state change, the RestartInProgress command message based on the MGCP may also be adopted as the command message indicating the termination service state change, and the same parameters are required by the two command messages for implementation in the embodiments of the present invention.

According to the embodiments of the present invention, by extending the ServiceChange command parameter based on the H.248/MeGaCo protocol or the RestartInProgress command parameter based on the MGCP, the MG sends the termination service state change indication information to the MGC, and sends the maintaining duration indication information of the service state to which the termination changes to the MGC simultaneously, or the MGC sends the termination service state change indication information to the MG, and sends the maintaining duration indication information of the service state to which the termination changes to the MG, which is rather convenient for the MG or MGC to realize effective subsequent control on the termination after the service state change of the termination.

The above descriptions are merely preferred embodiments of the present invention, but not intended to limit the scope of the present invention. Any modification, equivalent replacement, or improvement made according to the appended claims of the present invention should fall within the scope of the present invention.

What is claimed is:

1. A method for responding to a termination service state change indication, comprising:
   receiving a command message indicating a termination service state change, wherein the command message at least comprises a method parameter and a duration parameter, the method parameter indicates a change method of the service state, and the duration parameter indicates a maintaining duration of the service state after being changed;
   changing the service state of the termination according the method parameter of the received command message; and
   maintaining the termination at the changed service state for the maintaining duration determined according to the duration parameter of the received command message.

2. The method for responding to a termination service state change indication according to claim 1, wherein:
   an entity for receiving the command message is a media gateway (MG),
   the command message is sent by a media gateway controller (MGC),
   the changing the service state of the termination according to the method parameter of the received command message comprises:
      changing the service state of the termination in the MG according to the method parameter of the received command message, and
   the maintaining the termination at the changed service state for the maintaining duration determined according to the duration parameter of the received command message comprises:
      maintaining the termination in the MG at the changed service state for the maintaining duration determined according to the duration parameter of the received command message.

3. The method for responding to a termination service state change indication according to claim 1, wherein:
   an entity for receiving the command message is a media gateway controller (MGC),
   the command message is sent by a media gateway (MG),
   the changing the service state of the termination according to the method parameter of the received command message comprises:
      changing the service state of the termination in the MGC according to the method parameter of the received command message, and
   the maintaining the termination at the changed service state for the maintaining duration determined according to the duration parameter of the received command message comprises:
      maintaining the termination in the MGC at the changed service state for the maintaining duration determined according to the duration parameter of the received command message.

4. The method for responding to a termination service state change indication according to claim 1 wherein when the service state after being changed is "InService", the method parameter is set to be "Restart", and the duration parameter is a unique duration parameter corresponding to the service state of "InService".

5. The method for responding to a termination service state change indication according to claim 1, wherein when the service state after being changed is "OutOfService", the method parameter is set to be "Graceful" or "Forced", and the duration parameter is a unique duration parameter corresponding to the service state of "OutOfService".

6. The method for responding to a termination service state change indication according to claim 1, wherein the duration parameter is set to be an absolute time or a relative time.

7. The method for responding to a termination service state change indication according to claim 6, wherein a starting point of the relative time is the absolute time for changing to the service state.

8. An apparatus, comprising:
   a determining unit configured to determine a command message indicating a termination service state change, wherein:
      the command message at least comprises a method parameter and a duration parameter,
      the method parameter indicates a change method of the service state, and
      the duration parameter indicates maintaining the termination at the changed service state for a maintaining duration determined according to the duration parameter; and
   a sending unit configured to send the determined command message.

9. The apparatus according to claim 8, wherein the apparatus is an media gateway controller (MGC); and
   the sending unit is configured to send the determined command message to a media gateway (MG).

10. The apparatus according to claim 8, wherein the apparatus is a media gateway (MG); and
    the sending unit is configured to send the determined command message to a media gateway controller (MGC).

11. The apparatus according to claim 8, wherein when the service state after being changed is "InService", the method parameter is set to be "Restart", and the duration parameter is a unique duration parameter corresponding to the service state of "InService".

12. The apparatus according to claim 8, wherein when the service state after being changed is "OutOfService", the method parameter is set to be "Graceful" or "Forced", and the duration parameter is a unique duration parameter corresponding to the service state of "OutOfService".

13. An apparatus, comprising:
    a receiving unit configured to receive a command message indicating a termination service state change, wherein:
       the command message at least comprises a method parameter and a duration parameter,
       the method parameter indicates a change method of the service state, and
       the duration parameter indicates a maintaining duration of the service state after being changed; and a processing unit configured to:
- change the service state of the termination according to the method parameter of the received command message, and
- maintain the termination at the changed service state for the maintaining duration determined according to the duration parameter of the received command message.

14. The apparatus according to claim 13, wherein the apparatus is a media gateway controller (MGC).

15. The apparatus according to claim 13, wherein the apparatus is a media gateway (MG).

16. The apparatus according to claim 13, wherein when the service state after being changed is "InService", the method parameter is set to be "Restart", and the duration parameter is a unique duration parameter corresponding to the service state of "InService".

17. The apparatus according to claim 13, wherein when the service state after being changed is "OutOfService", the method parameter is set to be "Graceful" or "Forced", and the duration parameter is a unique duration parameter corresponding to the service state of "OutOfService".

* * * * *